2,873,286
Patented Feb. 10, 1959

2,873,286
ORGANIC COMPOUNDS AND PROCESS

J Allan Campbell, Kalamazoo Township, Kalamazoo County, John C. Babcock, Portage Township, Kalamazoo County, and John A. Hogg, Kalamazoo Township, Kalamazoo County, Mich., assignors to The Upjohn Company, Kalamazoo, Mich., a corporation of Michigan No Drawing. Application February 14, 1957
Serial No. 640,090

5 Claims. (Cl. 260—397.45)

The present invention relates to novel steroids and is more particularly concerned with 3β,11β,17β-trihydroxy-17α-methyl-5-androstene, the 3β-acylate, the 11β,17β-diacylate, the triacylate thereof, 3β,17β-dihydroxy-17α-methyl-5-androsten-11-one, the 3β-acylate and the 3β,17β-diacylate thereof.

The novel compounds of the present invention and the process of production thereof may be represented by the following sequence of formulae:

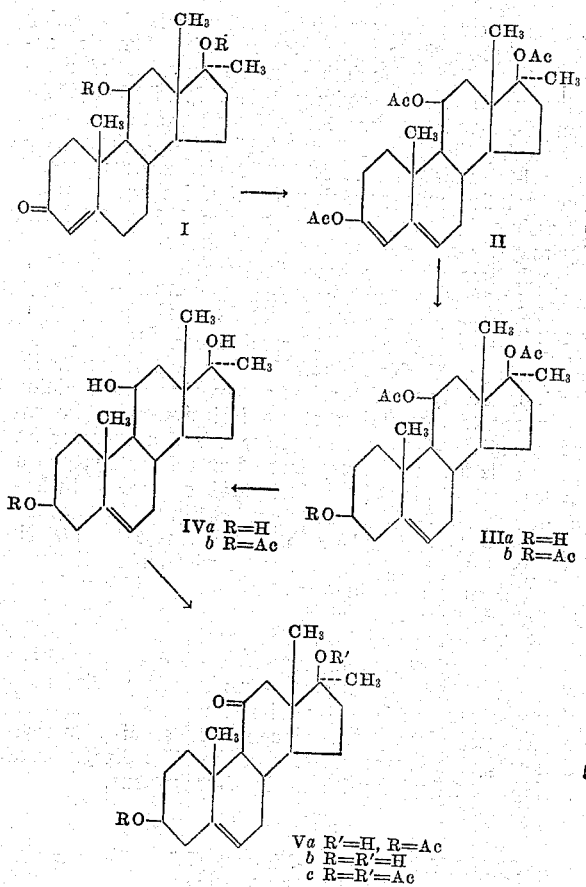

wherein Ac is an acyl radical of an organic carboxylic acid, preferably of a hydrocarbon carboxylic acid containing from one to nine carbon atoms, and R and R' are selected from the group consisting of hydrogen and acyl radicals of formula Ac, defined as above.

The process of the instant invention comprises: treating 11β,17β-dihydroxy-17α-methyl-4-androsten-3-one (I) or an ester thereof with an acylating agent, for example, an anhydride, a chloride or bromide of an organic carboxylic acid, preferably a hydrocarbon carboxylic acid containing from one to nine carbon atoms or an isopropenyl acylate wherein the acyl group is of a hydrocarbon carboxylic acid, at a temperature between sixty degrees centigrade and the reflux temperature of the mixture (at standard pressure) to obtain the 3,11β,17β-triacyloxy-17α-methyl-3,5-androstadiene (II); reducing the thus obtained 3,11β,17β-triacyloxy-17α-methyl-3,5-androstadiene (II) with an alkali metal borohydride such as sodium, potassium, or lithium borohydride to obtain the corresponding 3β-hydroxy-11β,17β-diacyloxy-17α-methyl-5-androstene (IIIa); (esterifying compound IIIa produces the corresponding 3β,11β,17β-triacyloxy-17α - methyl - 5 - androstene (IIIa); (esterifying compound IIIa produces the corresponding 3β,11β,17β - triacyloxy-17α-methyl-5-androstene (IIIb)); hydrolizing the thus obtained 3β - hydroxy - 11β,17β - diacyloxy - 17α - methyl - 5 - androstene or, respectively, the 3β,11β,17β - triacyloxy - 17α - methyl - 5 - androstene with lithium aluminum hydride to produce 3β,11β,-17β - trihydroxy - 17α - methyl - 5 - androstene (IVa); esterifying compound IVa with an acylating agent selected from the group consisting of anhydrides and halides of organic carboxylic acids, preferably, hydrocarbon carboxylic acids containing from one to nine carbon atoms, inclusive, producing the corresponding 3β - acyloxy - 11β,17β - dihydroxy - 17α - methyl - 5-androstene (IVb) which can be oxidized with chromic anhydride to give the corresponding 3β-acyloxy-17β-hydroxy-17α-methyl-5-androsten-11-one (Va). Hydrolysis of the 3β-acyloxy-17β-hydroxy-17α-methyl-5-androsten-11-one with a base such as sodium hydroxide, potassium hydroxide, or the like, produces the corresponding 3β,17β-dihydroxy-17α-methyl-5-androsten-11-one (Vb). Reesterification at a temperature of sixty degrees up to the reflux temperature of a mixture of 3β,17β-dihydroxy,17α-methyl-5-androsten-11-one with an acid anhydride, defined as above, produces the corresponding 3β,17β-diacyloxy-17α-methyl-5-androsten-11-one (Vc).

It is an object of the instant invention to provide 3β,11β,17β-trihydroxy-17α-methyl-5-androstene, the 3β-acylate, the 11β,17β-diacylate, and the triacylate thereof, 3β,17β-dihydroxy-17α-methyl-5-androsten-11-one, the 3β-acylate and the 3β,17β-diacylate thereof. It is another object of the instant invention to provide a process for the production of 3β,11β,17β-trihydroxy-17α-methyl-5-androstene and 3β,17β-dihydroxy-17α-methyl-5-androsten-11-one and the esters thereof. Other objects of the instant invention will be apparent to those skilled in the art to which this invention pertains.

The novel compounds of the instant invention, 3β,11β,17β-trihydroxy-17α-methyl-5-androstene and 3β,17β-dihydroxy-17α-methyl-5-androsten-11-one and the various esters thereof are important anabolic agents which in addition have androgenic and cardiac-regulatory effects. They also promote erythropoiesis and are therefore useful drugs in the treatment of protein-anabolic deficient and anemic patients. They also produce a tranquilizing and sedative effect by action on the central nervous system. The compounds may be given as injectables in oil suspensions or may be given intravenously as water soluble sodium salts or respectively amine salts of hemisuccinates or other esters derived from polycarboxylic acid esters of 3β,11β,17β-trihydroxy-17α-methyl-5-androstene or, respectively, 3β,17β-dihydroxy-17α-methyl-5-androsten-11-one. Other mono- and tri-esters of 3β,11β,17β-trihydroxy-17α-methyl-5-androstene and mono- and diesters of 3β,17β-dihydroxy-17α-methyl-5-androsten-11-one such as the acetates, propionates, cyclopentylpropionates, dimethylglutarates, phenylacetates, or the like, are useful for intramuscular injections.

The following examples are illustrative of the process and products of the present invention, but are not to be construed as limiting.

Example 1

3β,11β,17β-trihydroxy-17α-methyl-5-androstene 11β,17β-diacetate

A solution was prepared containing in 100 milliliters of toluene, five grams of 17α-methyl-11β-hydroxytestosterone (U. S. 2,735,854) (I) 25 milliliters of acetic anhydride and 100 milligrams of para-toluenesulfonic acid. This solution was heated in a nitrogen atmosphere at reflux for a period of four and one half hours. Thereafter the solvent was removed in vacuo. The thus obtained residue, crude 3,11β,17β-trihydroxy-17α-methyl-3,5-androstadiene 3,11β,17β-triacetate (II) resisted crystallization. For the subsequent reduction, a solution of the crude material (II) in 100 milliliters of 95 percent ethanol and three milliliters of ten percent sodium hydroxide solution was prepared and this solution was cooled to zero degrees centigrade. To this cooled solution was added a solution of five grams of sodium borohydride in 100 milliliters of seventy percent aqueous ethanol with stirring and under cooling. After one hour another portion of 2.5 grams of sodium borohydride in fifty milliliters of seventy percent aqueous ethanol was added. The thus obtained reaction mixture was then stirred for three days at five degrees centigrade, whereupon fifteen milliliters of ten percent sodium hydroxide solution was added and the solution heated to near its boiling point. The alcohol was evaporated in vacuo and to the concentrate was added ice and three-normal hydrochloric acid under stirring. The precipitated product, was collected, washed with water, dilute hydrochloric acid and water and then dried to yield 4.7 grams of 3β,11β,17β-trihydroxy-17α-methyl-5-androstene 11β,17β-diacetate (IIIa).

Example 2

3β,11β,17β-trihydroxy-17α-methyl-5-androstene

The 3β,11β,17β-trihydroxy-17α-methyl-5-androstene 11β,17β-diacetate of Example 1 was dissolved in fifty milliliters of tetrahydrofuran and thereto was added 1.5 grams of lithium aluminum hydride with continuous stirring. After about three minutes the reaction mixture became a hard gel. Fifty milliliters of ether was then added and the mixture stirred for one hour. Ethyl acetate and water were added, the aqueous phase was separated and extracted with ether and methylene chloride, and the non-aqueous phase and the extracts were combined, dried over anhydrous magnesium sulfate and filtered. The filtrate on standing overnight deposited 1.6 grams of crystals of crude 3β,11β,17β-trihydroxy-17α-methyl-5-androstene (IVa). The remaining liquid was concentrated to dryness, triturated with methylene chloride to give an additional amount of 1.3 grams of residue. The two crude crops were combined and recrystallized from fifteen milliliters of 3A alcohol (anhydrous ethanol denatured with methanol) containing 0.5 milliliter of water to give 1.7 grams of 3β,11β,17β-trihydroxy-17α-methyl-5-androstene which, after another recrystallization from ethyl acetate, yielded 1.2 grams of pure 3β,11β,17β-trihydroxy-17α-methyl-5-androstene of melting point 230 to 235 degrees centigrade and rotation $[\alpha]_D$ minus 68 degrees.

Analysis.—Calcd. for $C_{20}H_{32}O_3$: C, 74.95; H, 10.07. Found: C, 74.53; H, 10.16.

The infrared spectrum showed bands for hydroxyl at 3610 and 3280, a carbon-carbon double bond at 1665, and carbon-OH bands at 1146, 1085, 1054 and 1030 cm.$^{-1}$ (in Nujol mineral oil).

Example 3

3β,11β,17β-trihydroxy-17α-methyl-5-androstene 11β,17β-dipropionate

In the same manner given in Example 1, 17α-methyl-11β-hydroxytestosterone was reacted with propionic anhydride in the presence of toluenesulfonic acid under reflux conditions to give 3,11β,17β-trihydroxy-17α-methyl-3,5-androstadiene 3,11β,17β-dipropionate.

Treating the thus obtained 3,11β,17β-trihydroxy-17α-methyl-3,5-androstadiene 3,11β,17β-tripropionate with potassium borohydride in potassium hydroxide solution in aqueous ethanol produced 3β,11β,17β-trihydroxy-17α-methyl-5-androstene 11β,17β-dipropionate.

Example 4

3β,11β,17β-trihydroxy-17α-methyl-5-androstene 11β,17β-dibutyrate

In the same manner given in Example 1, 17α-methyl-11β-hydroxytestosterone was heated to reflux with butyric anhydride in the presence of para-toluenesulfonic acid to give 3,11β,17β-trihydroxy-17α-methyl-3,5-androstadiene 3,11β,17β-tributyrate.

Treating the thus obtained 3,11β,17β-trihydroxy-17α-methyl-3,5-androstadiene 3,11β,17β-tributyrate in aqueous alcoholic solution with sodium borohydride and sodium hydroxide produced 3β,11β,17β-trihydroxy-17α-methyl-5-androstene 11β,17β-dibutyrate.

Example 5

3β,11β,17β-trihydroxy-17α-methyl-5-androstene 11β,17β-dibenzoate

In the same manner given in Example 1, treating 17α-methyl-11β-hydroxytestosterone with benzoic anhydride in benzene solution in the presence of para-toluenesulfonic acid produced 3,11β,17β-trihydroxy-17α-methyl-3,5-androstadiene 3,11β,17β-tribenzoate.

Treating the thus produced 3,11β,17β-trihydroxy-17α-methyl-3,5-androstadiene 3,11β,17β-tribenzoate in methanol solution with potassium borohydride and aqueous potassium hydroxide solution produced 3β,11β,17β-trihydroxy-17α-methyl-5-androstene 11β,17β-tribenzoate.

In the same manner shown in Examples 1, 3, 4, and 5, other 3β,11β,17β-trihydroxy-17α-methyl-5-androstene 11β,17β-diacylates are obtained by reacting 17α-methyl-11β-hydroxytestosterone under reflux conditions with an anhydride, a chloride or bromide of an organic carboxylic acid, preferably a hydrocarbon carboxylic acid containing from one to nine carbon atoms, inclusive, or an isopropenyl acylate wherein the acyl group is of a hydrocarbon carboxylic acid in the presence of an acid catalyst, such as toluenesulfonic acid, sulfuric acid, or gaseous hydrochloric acid, to give the corresponding 3,11β,17β-trihydroxy-17α-methyl-3,5-androstadiene 3,11β,17β-triacylate which is thereupon treated with an alkali borohydride, such as sodium, potassium, or lithium borohydride, in aqueous alkali solutions, for example, sodium hydroxide, potassium hydroxide, or the like, to give the corresponding 3β,11β,17β-trihydroxy-17α-methyl-5-androstene 11β,17β-diacylate. Representative diacylates thus prepared include the divalerate, dihexanoate, diheptanoate, dioctanoate, diphenylacetate, di-(trimethylacetate), di-(trifluoroacetate), and the like diacylates of 3β,11β,17β-trihydroxy-17α-methyl-5-androstene.

Example 6

3β,11β,17β-trihydroxy-17α-methyl-5-androstene 3β,11β,17β-triacetate

A solution was prepared containing in five milliliters of pyridine and five milliliters of acetic anhydride, 0.5 gram of 3β,11β,17β-trihydroxy-17α-methyl-5-androstene 11β,17β-diacetate. This solution was allowed to stand at room temperature for a period of six hours and thereupon poured into 100 milliliters of ice water. The solution was allowed to stand thereupon overnight and was then filtered, the precipitate separated and recrystallized from ethyl acetate and acetone to give 3β,11β,17β-trihydroxy-17α-methyl-5-androstene 3β,11β,17β - triacetate (IIIb).

EXAMPLE 7

3β,11β,17β-trihydroxy-17α-methyl-5-androstene 3β,11β,17β-tripropionate

In the same manner given in Example 6, reacting 3β,11β,17β - trihydroxy-17α-methyl-5-androstene 11β,17β-diproprionate with propionic anhydride in pyridine solution yielded 3β,11β,17β - trihydroxy - 17α-methyl-5-androstene 3β,11β,17β-tripropionate.

EXAMPLE 8

3β,11β,17β - trihydroxy - 17α-methyl-5-androstene 3β,11β,17β-tributyrate

In the same manner given in Example 6, 3β,11β,17β, trihydroxy - 17α - methyl-5-androstene 11β,17β-dibutyrate was reacted with butyric anhydride in pyridine solution to give 3β,11β,17β - trihydroxy-17α-methyl-5-androstene 3β,11β,17β-tributyrate.

EXAMPLE 9

3β,11β,17β - trihydroxy - 17α-methyl-5-androstene 3β,11β,17β-tribenzoate

In the same manner given in Example 6, 3β,11β,17β-trihydroxy - 17α-methyl-5-androstene 11β,17β-dibenzoate was reacted in pyridine solution with benzoyl chloride to give 3β,11β,17β-trihydroxy-17α-methyl-5-androstene 3β,11β,17β-tribenzoate.

EXAMPLE 10

3β,11β,17β - trihydroxy-17α-methyl-5-androstene 3β-benzoate 11β,17β-diacetate

In the same manner given in Example 6, 3β,11β,17β-trihydroxy-17α-methyl-5-androstene 11β,17β-diacetate was reacted with benzoyl chloride in pyridine solution to give 3β,11β,17β-trihydroxy-17α-methyl-5-androstene 3β-benzoate, 11β,17β-diacetate.

In the same manner as shown in Examples 6 through 10, reacting 3β,11β,17β - trihydroxy-17α-methyl-5-androstene 11β,17β-diacylates with acid anhydride or acid chlorides or bromides of organic carboxylic acid or hydrocarbon carboxylic acid produces the corresponding 3β,11β,17β-trihydroxy-17α-methyl-5-androstene triacylates. In this manner the trivalerate, trihexanoate, triheptanoate, trioctanoate, triphenylpropionate, or mixed esters like the 3β-propionate, 11β,17β-diacetate; the 3-butyrate, 11β,17β-dibenzoate; and similar mixed tri-esters of 3β,11β,17β-trihydroxy-17α-methyl-5-androstene are obtained.

EXAMPLE 11

3β,11β,17β - trihydroxy-17α-methyl-5-androstene 3β-acetate

A solution containing 0.2 gram of 3β,11β,17β-trihydroxy-17α-methyl-5-androstene (IVa) in two milliliters of acetic anhydride and two milliliters of pyridine was allowed to stand at room temperature (twenty to thirty degrees centigrade) for a period of sixteen hours. Thereafter the mixture was poured into fifty milliliters of ice water. The pyridine was neutralized with hydrochloric acid. The precipitated product was collected, washed with water and dried. It was recrystallized from aqueous acetone to give pure 3β,11β,17β-trihydroxy-17α-methyl-5-androstene 3β-acetate (IVb), of melting point 88 to 90 degress centigrade.

EXAMPLE 12

3β,11β,17β-trihydroxy-17α-methyl-5-androstene 3β-benzoate

In the same manner as given in Example 11, reacting at room temperature, 3β,11β,17β-trihydroxy-17α-methyl-5-androstene, dissolved in pyridine, with benzoyl chloride yielded 3β,11β,17β - trihydroxy-17α-methyl-5-androstene 3β-benzoate.

In the same manner given in Examples 11 and 12, reacting at room temperature 3β,11β,17β-trihydroxy-17α-methyl-5-androstene with acid anhydride or acyl halides of organic carboxylic acids, or, preferably hydrocarbon carboxylic acids containing from one to nine carbon atoms, inclusive, produces the corresponding 3β-acylate of 3β,11β,17β-trihydroxy-17α-methyl-5-androstene. Representative such 3β-acylates of 3β,11β,17β-trihydroxy-17α-methyl-5-androstene comprise the 3β-propionate, butyrate, valerate, isovalerate, hexanoate, heptanoate, octanoate, phenylacetate, phenylpropionate, trifluoroacetate, hemisuccinate, dimethylbutyrate, or the like.

EXAMPLE 13

3β,17β - dihydroxy - 17α - methyl-5-androsten-11-one 3β-acetate

To a solution of 0.5 gram of 3β,11β,17β-trihydroxy-17α-methyl-5-androstene 3-acetate in five milliliters of pyridine was added 0.5 gram of chromic anhydride in five milliliters of pyridine with stirring and cooling. After stirring overnight at room temperature, the mixture was poured into water and extracted with methylene chloride. The methylene chloride solution was washed with water, dried over anhydrous magnesium sulfate and evaporated. The residue was recrystallized from acetone-hexane to give 3β,17β-dihydroxy-17α-methyl-5-androsten-11-one 3-acetate.

EXAMPLE 14

3β,17β-dihydroxy-17α-methyl-5-androsten-11-one 3β-benzoate

In the same manner given in Example 13, 3β,11β,17β-trihydroxy-17α-methyl-5-androstene 3β-benzoate was reacted with chromic acid in pyridine solution to give 3β,17β-dihydroxy-17α-methyl-5-androsten-11-one 3β-benzoate.

In the same manner as shown in Examples 13 and 14, oxidizing 3β,11β,17β-trihydroxy-17α-methyl-5-androstene 3β-monoacylates produces the corresponding 3β,17β-dihydroxy-17α-methyl-5-androsten-11-one 3β-acylate, such as for example, the 3β-propionate, butyrate, valerate, isovalerate, hexanoate, heptanoate, octanoate, toluate, phenylacetate, phenylpropionate, or the like, of 3β,17β-dihydroxy-17α-methyl-5-androsten-11-one.

EXAMPLE 15

3β,17β-dihydroxy-17α-methyl-5-androsten-11-one

A solution of 3β,17β-dihydroxy-17α-methyl-5-androsten-11-one 3β-acetate in methanol was freed of oxygen by letting oxygen-free nitrogen pass for a period of one hour through the solution. Thereafter under exclusion of air was added a solution containing fifty milligrams of potassium hydroxide in two milliliters of methanol freed of oxygen in the manner mentioned before. The thus-obtained mixture was allowed to stand under exclusion of oxygen in a nitrogen atmosphere for a period of eighteen hours, was thereupon poured into 75 milliliters of water, extracted with three 25-milliliter portions of methylene chloride, the methylene chloride portions combined, washed with water repeatedly, dried over anhydrous sodium sulfate, evaporated and the thus obtained residue recrystallized from methanol to give 3β,17β-dihydroxy-17α-methyl-5-androsten-11-one.

EXAMPLE 16

3β,17β - dihydroxy - 17α - methyl - 5 - androsten - 11 - one 3β,17β-diacetate 0.1 gram of 3β,17β-dihydroxy-17α-methyl-5-androsten-11-one was heated on the water bath with one gram of acetic anhydride. After one hour the mixture was poured into fifteen milliliters of ice water, extracted with three five-milliliter portions of methylene chloride, the combined methylene chloride portions washed, dried over anhydrous sodium sulfate, and evaporated to give 3β,17β-dihydroxy - 17α - methyl - 5 - androsten-11-one 3β,17β-diacetate.

Example 17

3β,17β-dihydroxy-17α-methyl-5-androsten-11-one 3β,17β-dipropionate

In the same manner as given in Example 16, 3β,17β-dihydroxy-17α-methyl-5-androsten-11-one was heated with excess of propionic anhydride to give 3β,17β-dihydroxy-17α-methyl-5-androsten-11-one 3β,17β-dipropionate.

In the same manner given in Examples 16 and 17, other 3β,17β-diacylates of 3β,17β-dihydroxy-17α-methyl-5-androsten-11-one can be prepared by heating 3β,17β-dihydroxy-17α-methyl-5-androsten-11-one with organic carboxylic anhydrides or, preferably hydrocarbon carboxylic anhydrides to temperatures between sixty degrees and the refluxing temperature of the reaction mixture, and recovering the thus produced 3β,17β-dihydroxy-17α-methyl-5-androsten-11-one 3β,17β-diacylates. Representative diacylates thus produced comprise the dibutyrate, divalerate, di-isovalerate, dihexanoate, diheptanoate, dioctanoate, dibenzoate, diphenylacetate, and the like of 3β,17β-dihydroxy-17α-methyl-5-androsten-11-one.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A compound selected from the group consisting of 3β,11β,17β-trihydroxy-17α-methyl-5-androsten, 3β,11β,17β-trihydroxy-17α-methyl-5-androstene 3β-acylates, 3β,11β,17β-trihydroxy-17α-methyl-5-androstene 11β,17β-diacylates, 3β,11β,17β-trihydroxy-17α-methyl-5-androstene 3β,11β,17β-triacylates, 3β,17β-dihydroxy-17α-methyl-5-androsten-11-one, 3β,17β-dihydroxy-17α-methyl-5-androsten-11-one 3β-acylate, 3β,17β-dihydroxy-17α-methyl-5-androsten-11-one 3β,17β-diacylate, wherein the acyl radical is of a hydrocarbon carboxylic acid containing from one to nine carbon atoms, inclusive.
2. 3β,11β,17β-trihydroxy-17α-methyl-5-androstene.
3. 3β,11β,17β-trihydroxy-17α-methyl-5-androstene 3β-acetate.
4. 3β,17β-dihydroxy-17α-methyl-5-androsten-11-one.
5. 3β,17β-dihydroxy-17α-methyl-5-androsten-11-one 3β-acetate.

References Cited in the file of this patent

UNITED STATES PATENTS

| | | |
|---|---|---|
| 2,520,656 | Reichstein | Aug. 29, 1950 |
| 2,695,260 | Murray | Nov. 23, 1954 |